United States Patent [19]

Bourgeois

[11] 4,174,774

[45] Nov. 20, 1979

[54] FOUR-WAY DIVERTING CONVEYOR

[76] Inventor: Ronald D. Bourgeois, 138 Ellison Park, Waltham, Mass. 02154

[21] Appl. No.: 873,242

[22] Filed: Jan. 30, 1978

[51] Int. Cl.² .................. B65G 47/00; B65G 47/34
[52] U.S. Cl. ............................... 198; 198/457; 198/474
[58] Field of Search ............... 198/413, 457, 474, 597, 198/790, 779, 850–853, 366, 471

[56] References Cited

U.S. PATENT DOCUMENTS

| | | | |
|---|---|---|---|
| 2,856,055 | 10/1958 | Moss et al. | 198/474 X |
| 3,134,476 | 5/1964 | Pierson et al. | 198/457 X |
| 3,961,700 | 7/1976 | Fleischauer | 198/790 |

FOREIGN PATENT DOCUMENTS 213666  3/1968  U.S.S.R. ................... 198/779

*Primary Examiner*—Robert B. Reeves
*Assistant Examiner*—Douglas D. Watts
*Attorney, Agent, or Firm*—Joseph S. Iandiorio

[57] ABSTRACT

A modular positive drive, high-speed response, diverting conveyor unit, which includes a support structure for continuously driving the rollers. There is a main direction control device for operating the drive apparatus to drive the rollers to convey selectively in a forward and reverse direction. There is a support frame and a mounting structure carried on the support structure for slidably supporting the support frame; a dynamic roller conveyor has parallel sets of raised and laterally spaced flights and a drive chain section; a drive system mounted on the support frame continuously drives the roller conveyor; a transverse direction control device operates the drive system to drive the roller conveyor to convey selectively in the left and right directions; an actuator mounted on the support structure moves the support frame selectively up to insert the flights interstitially of the rollers to divert the conveyed goods from the main direction and down to withdraw the flights and allow the goods to continue in the main direction.

5 Claims, 6 Drawing Figures

FOUR-WAY DIVERTING CONVEYOR

FIELD OF INVENTION

This invention relates to a modular positive drive high-speed response diverting conveyor.

BACKGROUND OF INVENTION

With increasing automation of manufacturing and warehousing operations, conveyors are becoming ever more relied upon for high-speed, reliable transfer of goods. Often, continuous manufacturing processes turn out goods faster than subsequent processing and finishing stations can perform. In order to accommodate this mismatch, diverting conveyors are used, for example, to distribute the product from the output conveyor of a fast stage to a number of input conveyors of subsequent slower stages. In such applications the lateral transfer to slower conveyors can cause jams on the faster conveyor due to the longer time required to effect the lateral transfer relative to the transit time of the goods on the faster main conveyor. In addition, the need for faster, more facile diverting conveyors requires a self-contained unit which can be fitted to operate compatibly with existing conveyor installations. Typically, conventional diverting systems are built in to the existing conveyors and are not designed to be added as auxiliary or peripheral equipment. More importantly, the diverting portion of the systems use belts interstitially of the main conveyor rollers, which require increased spacing of those rollers and consequent limitation of the smallest size objects which can be carried without risk of damage to the objects or jamming of the conveyor.

SUMMARY OF INVENTION

It is an object of this invention to provide an improved, modular, compact, simplified four-way transfer conveyor unit.

It is a further object of this invention to provide such a conveyor unit having high-speed diverting action.

It is a further object of this invention to provide such a conveyor unit which permits closer positioning of the main conveyor rollers for accommodation of smaller goods.

The invention features a modular positive drive, high-speed response, diverting conveyor unit, which includes a support structure and a static conveyor including a plurality of rollers. The drive apparatus is disposed within the support structure for continuously driving the rollers, and there is a main direction control device for operating the drive apparatus to drive the rollers to convey selectively in a forward and reverse direction. There is a support frame and a mounting structure carried on the support structure for slidably supporting the support frame. A dynamic roller conveyor has parallel sets of raised and laterally spaced flights and a drive chain section. A drive system mounted on the support frame continuously drives the roller conveyor. A transverse direction control device operates the drive system to drive the roller conveyor to convey selectively in the left and right directions. Actuator means mounted on the support structure moves the support frame selectively up to insert the flights interstitially of the rollers to divert the conveyed goods from the main direction and down to withdraw the flights and allow the goods to continue in the main direction.

DISCLOSURE OF PREFERRED EMBODIMENT

Other objects, features and advantages will occur from the following description of a preferred embodiment and the accompanying drawings, in which.

The invention may be accomplished with a modular positive drive, high-speed response diverting conveyor, which has a support structure and a static conveyor which has a plurality of spaced rollers which are carried by the support structure. A drive apparatus disposed inside of the support structure may continuously drive the rollers and includes a drive shaft with pulleys that engage belts that drive similar pulleys which are fixed to rotate with the rollers. Typically the drive shaft is driven by a motor which is quickly able to reverse its direction, so that the rollers can convey in the main direction either forward or reverse.

There is a support frame carried within the support structure, and a mounting structure carried in the support structure slidably supports that support frame. There is a dynamic roller conveyor which has parallel sets of raised, laterally spaced flights and a drive chain section. With the location of the support frame, and the roller conveyor which it carries, inside the support structure, along with the placement therein of the drive apparatus, a large degree of compactness is attained for the modular conveyor system.

The dynamic roller conveyor flights are composed of very narrow members which fit between the spaced rollers and run parallel to them, allowing for minimum spacing between the rollers for the accommodation of even the smallest object to be conveyed. In addition, the dynamic roller conveyor also includes a chain section which engages a sprocket included in a drive system for continuously driving the roller conveyor. A transverse direction control device operates the drive shaft and the sprocket or sprockets continuously at high speed, and can switch directions from left feed to right feed and vice versa extremely quickly. Actuator means, such as an electric solenoid or a hydraulic mechanism, is mounted on the support structure and moves the support frame selectively up and down. When no diverting is required, the support frame is down and the top of the flights are just minimally below the tops of the rollers which convey the goods in the main direction. When a diverting is required, the actuator moves the support frame up so that the flights almost immediately rise above the rollers, grip the goods, and divert them to the left or right.

Figure 1:
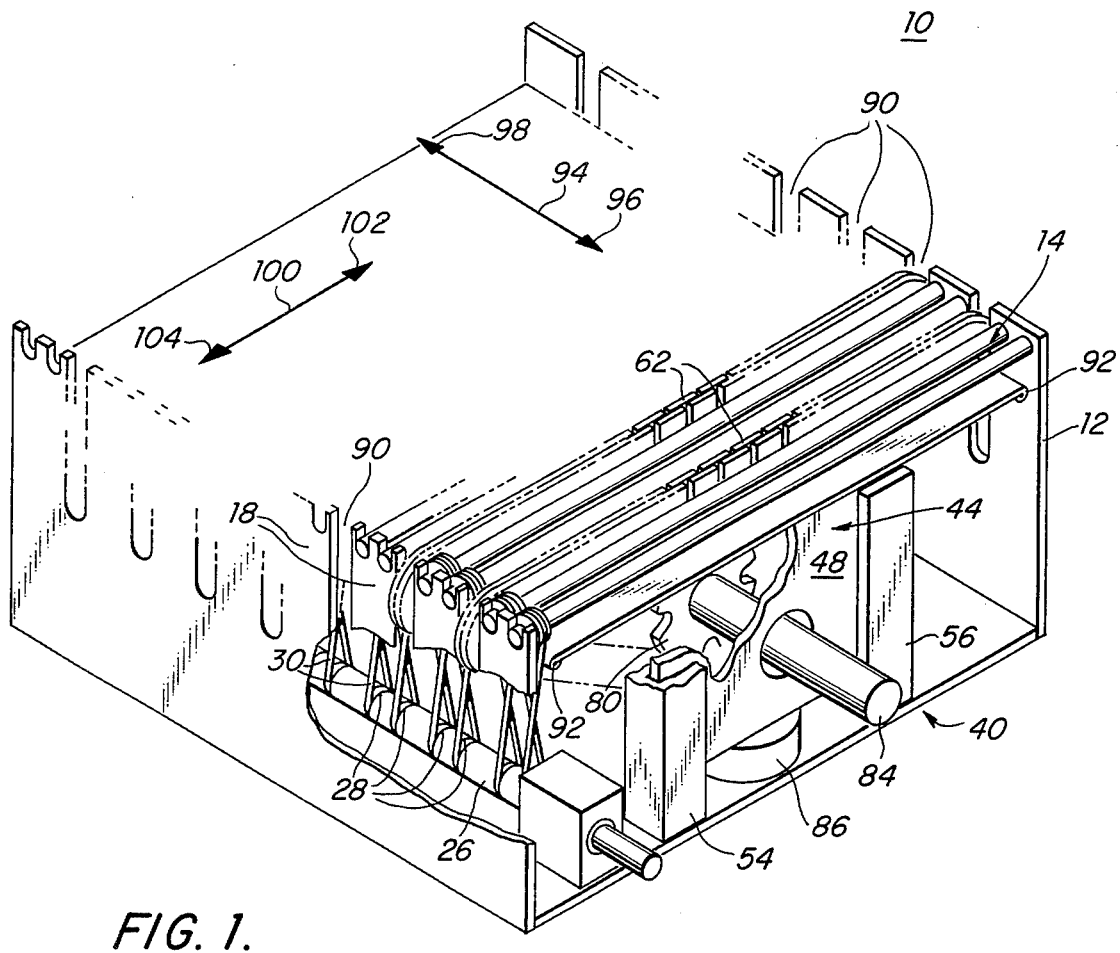
FIG. 1 is an axonometric view with portions broken away of a modular diverting conveyor according to this invnention.
Figure 2:
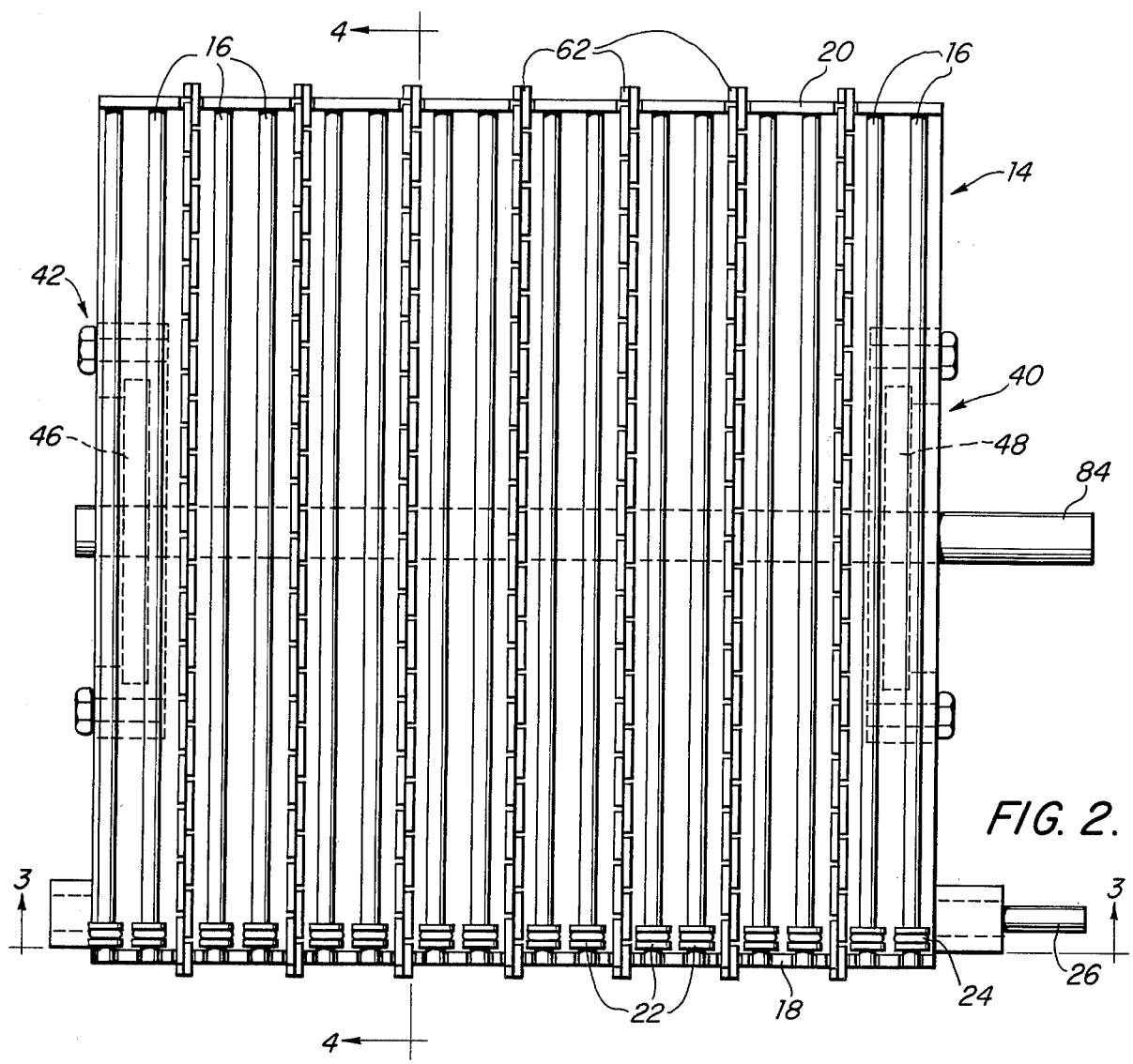
FIG. 2 is a top plan view of the conveyor unit of FIG. 1.
Figure 3:
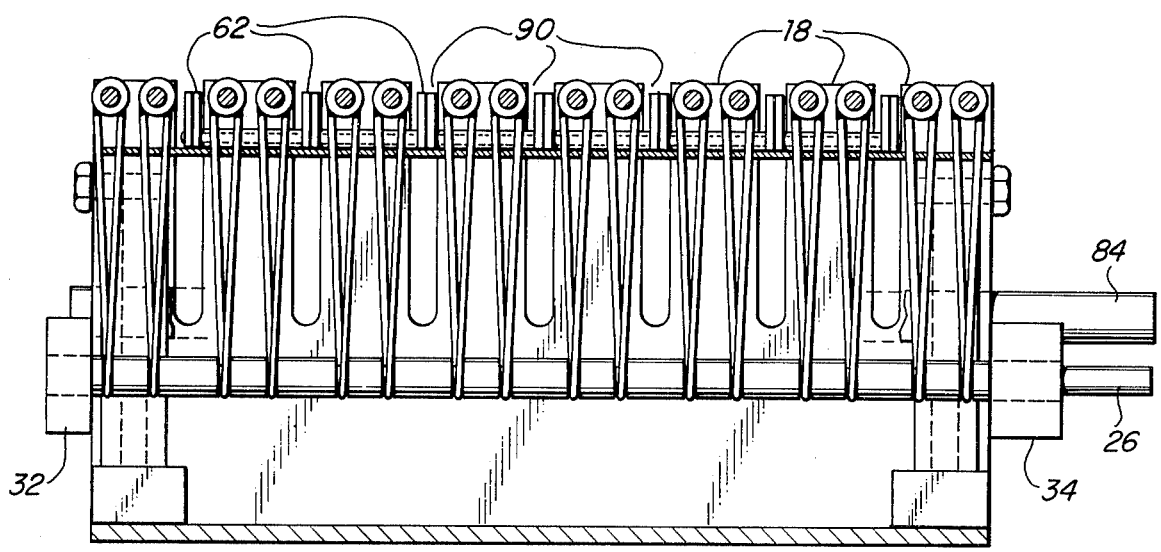
FIG. 3 is a view taken along lines 3—3 of FIG. 2 with the diverting conveyor lowered.

There is shown in FIG. 1 a conveyor unit 10 according to this invention, including a support structure 12 and a static main conveyor 14, FIG. 2, comprised of a plurality of rollers 16 rotatably mounted on upstanding members 18 and 20 of support structure 12. Pulleys 22 are mounted between members 18 and the ends of rollers 16, and constitute a portion of drive apparatus 24 which also includes drive shaft 26, FIGS. 1 and 3, which has a number of pulleys or grooves in it for engaging belt 30, which also engage pulleys 22 to drive rollers 16. Shaft 26 is rotatably mounted in bearings 32, 34, FIG. 3.

Figure 4:
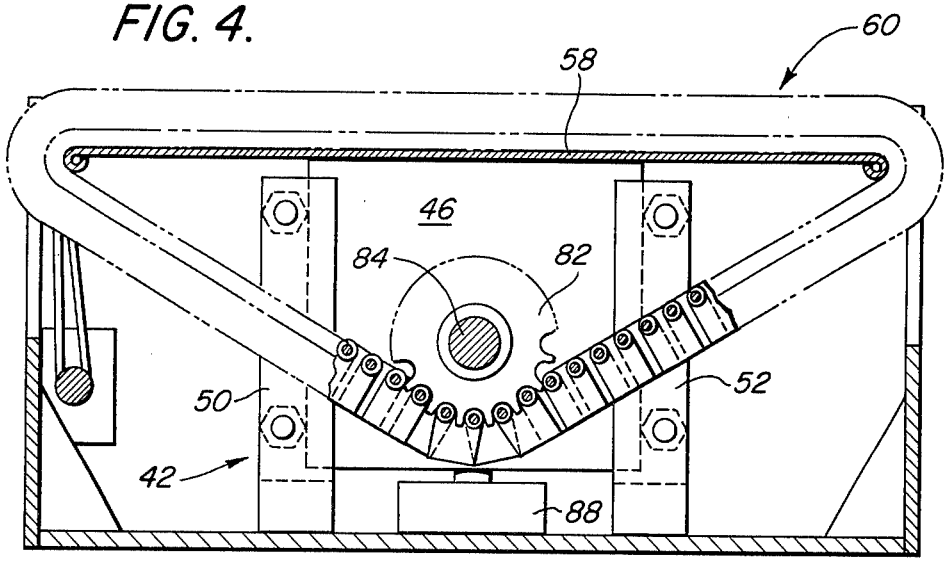
FIG. 4 is a view taken along lines 4—4 of FIG. 2 with the diverting conveyor raised.
Figure 4A:
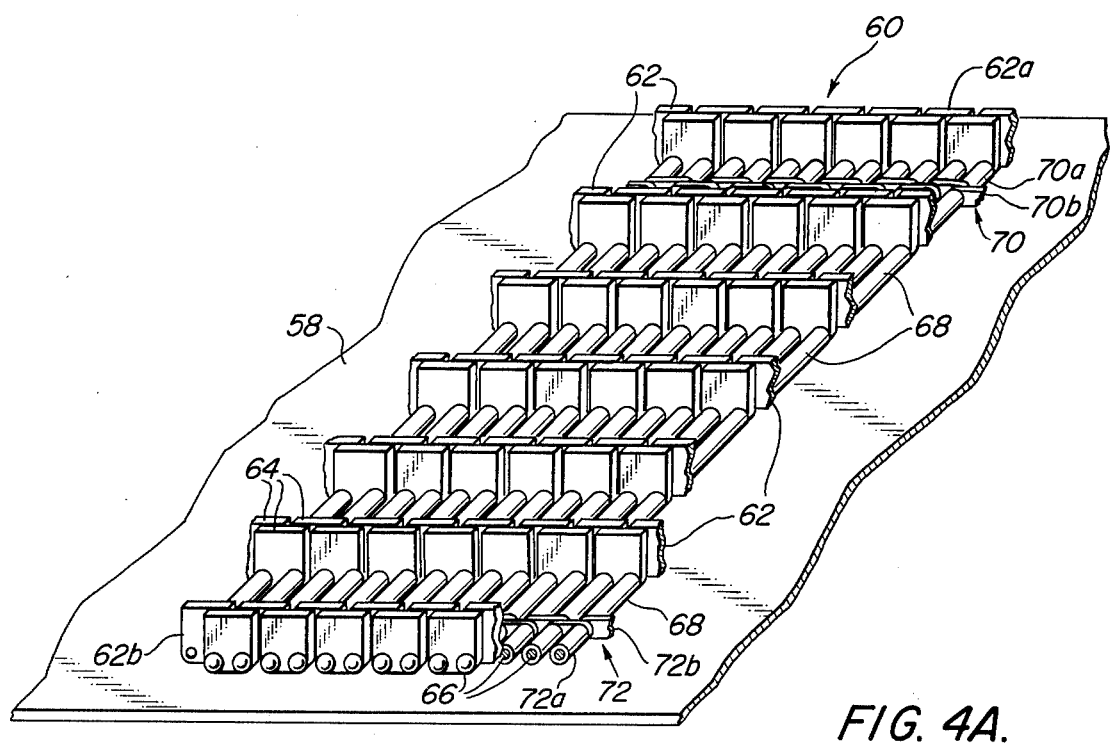
FIG. 4A is a partial axonometric view illustrating details of the diverting conveyor.

A mounting structure, gib 40, FIG. 1, and gib 42, FIG. 4, is used to slidingly support frame 44. Mounting structure 40 includes two slide members 46, FIG. 4, and 48, FIG. 1. Slide member 46 is slidably supported in slides 50, 52, while slide member 48 is slidably supported in slides 54, 56, of gib 40. Plate 58 of support frame 44 carries dynamic roller conveyor 60, which is shown in more detail in FIG. 4a. Roller conveyor 60 includes a plurality of raised flights 62, each set composed of a group of overlapping blades 64, which are mounted on shafts 66 and spaced by rollers 68. Just within the outermost sets of flights 62a and 62b, there are located chain sections 70, 72, each of which includes somewhat shorter rollers 70a and 72a and chain links 70b and 72b.

These chain sections are engaged by sprockets 80, 82, driven by shaft 84. Electric solenoid actuators 86 and 88 selectively raise and lower support frame 44 to control the diverting action. Slots 90 provided between members 18 permit each set 62 of raised flights to pass around the thin edges 92 of plate 58.

The main conveyance direction of conveyor unit 10, FIG. 1, is in the direction of arrow 94, either forward, 96, or reverse, 98. The transverse direction to this is designated the diverting direction 100 and is referred to merely as left 102 and right 104.

Figure 5:
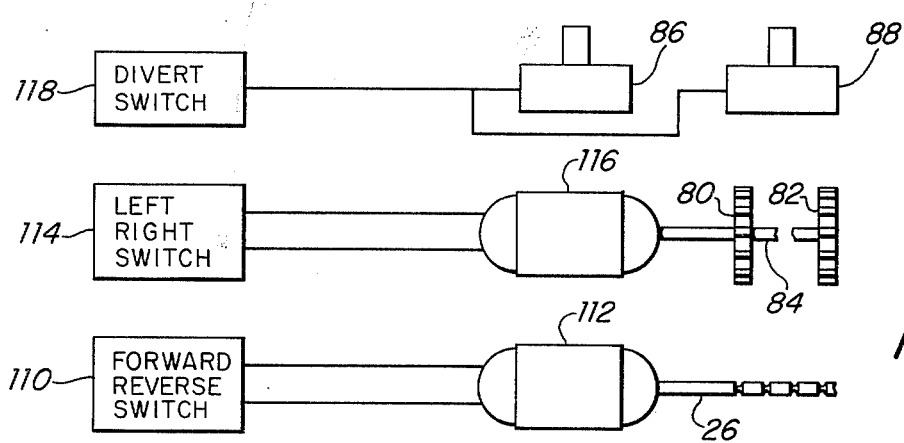
FIG. 5 is a schematic diagram of the controls for the conveyor system according to this invention.

In operation, a forward-reverse switch 110, FIG. 5, is actuated to drive motor 112 and shaft 26 in either the forward or reverse direction. In addition, left-right switch 114 is operated to cause motor 116 to drive shaft 84 and sprockets 80, 82, in either the left or the right direction. Motor 116 may be run at a much higher speed relative to motor 112, so that diverting to the left or right by dynamic conveyor 16 may be effected quickly without interfering with the oncoming goods traveling in the main direction 94. Periodically, regularly or at random, when diverting is required, left-right switch 114 is actuated to designate the proper direction of diverting: motor 116 is generally kept running continuously to be constantly ready to immediately respond to a command. The divert switch 118 is then operated to actuate solenoids 86 and 88 to raise support frame 44 to place the tops of the sets of flights 62 sufficiently above rollers 16 to effect the diverting action.

Other embodiments will occur to those skilled in the art and are within the following claims:

What is claimed is:

1. A modular positive drive high-speed response diverting conveyor unit comprising:
   a support structure;
   a static conveyor including a plurality of spaced rollers mounted in said support structure;
   a drive apparatus disposed within said support structure for continuously driving said rollers;
   a main direction control device for operating said drive apparatus to drive said rollers to convey selectively in the forward and reverse direction;
   a support frame and a mounting structure carried on the support structure for slidably supporting said support frame; said mounting structure including spaced slides for slidably receiving a slide member carried by said support frame;
   a dynamic roller conveyor having parallel sets of raised laterally spaced flights and a drive chain section carried by said support frame;
   a drive system mounted on said support frame for continuously driving said roller conveyor;
   a transverse direction control device for operating said drive system to drive said roller conveyor to convey selectively in the left and right directions; and
   actuator means mounted on said support structure for moving said support frame selectively up to insert said flights interstitially of said rollers to divert conveyed goods from the main direction and down to withdraw said flights and allow goods to continue in the main direction.

2. The diverting conveyor unit of claim 1 in which said transverse direction control device includes a reversing motor for driving said sprocket and a reversing switch for operating said motor.

3. The diverting conveyor unit of claim 1 in which said drive apparatus includes a pulley wheel on each said roller, a drive shaft and a belt engaged with each said pulley and driven by said drive shaft.

4. The diverting conveyor unit of claim 3 in which said main direction control device includes a reversing motor for driving said drive shaft and a reversing switch for operating said motor.

5. The diverting conveyor unit of claim 1 in which said drive system includes a sprocket for engaging said drive chain section.

* * * * *